United States Patent [19]

Williams

[11] 3,746,873
[45] July 17, 1973

[54] ANTI-CONDENSATION DEVICE FOR INFRA-RED DETECTOR

[75] Inventor: Richard Jean Williams, Marlton, N.J.

[73] Assignee: RCA Corporation, New York, N.Y.

[22] Filed: Dec. 24, 1970

[21] Appl. No.: 101,328

[52] U.S. Cl. .......................... 250/352, 62/DIG. 9
[51] Int. Cl. .............................................. G01j 5/06
[58] Field of Search ...................... 250/83.3 H, 83; 313/101; 62/DIG. 9

[56] References Cited
UNITED STATES PATENTS 3,258,602  6/1966  Promish ........................ 250/83.3 H
3,149,231  9/1964  Ravich .......................... 250/83.3 H Primary Examiner—Archie R. Borchelt
Attorney—Edward J. Norton

[57] ABSTRACT

An infra-red (IR) detector operating in ambient temperatures in the range of 4° to 200° Kelvin, and pressures in the range of $10^{-2}$ to $10^{-12}$ mm Hg is provided with a trap for preventing condensation and thus icing of water molecules in the infra-red (IR) optical path that may be present in or near the detector or icing of water molecules which may emerge from the surface of the components adjacent to the detector owing to the ambient low pressures. The detector is mounted within a two-piece cylindrical shield around the IR-path arranged in coaxial spaced relation. The clearance space between the shield pieces defined by the overlapping open ends of the cylinders is less than the mean free path of water molecules at the ambient pressure which is less than 10 microns for orbiting satellites. The outer shield is kept at a temperature that is greater than the vapor condensation or crystallization temperature while the inner shield, insulated from the outer shield, is kept at a temperature that is less than the vapor condensation or crystallization temperature. Water vapor or other vaporizable contaminants that would tend to leak into the portion of the inner shield adjacent to the detector surface are condensed or crystallized at the surface of the inlet portion of the space and thus precludes such vapors from being deposited on the operating portions of the detector disposed within the inner shield. Although water vapor is the more troublesome volatile vapor that is removed from the sensor chamber, oils, alcohols, and various synthetic polymers are also removed precluding contaminant deposition in the sensor chamber.

9 Claims, 2 Drawing Figures

Patented July 17, 1973                                                3,746,873

INVENTOR.
Richard J. Williams
BY
*Joseph D Lazar*
ATTORNEY

3,746,873

ANTI-CONDENSATION DEVICE FOR INFRA-RED DETECTOR

BACKGROUND OF THE INVENTION

1. Field of the Invention

This invention relates to infra-red detectors, and more particularly, to passively cooled infra-red detectors having traces of residual water molecules or other volatile contaminants in the ambient.

2. Description of the Prior Art

Infra-red detectors as sensors are being used increasingly in such diverse applications as satellite horizon sensors, weather satellites, military reconnaissance, mapping for industrial plants, and spectrometers. Some infra-red detectors must operate at very low temperatures in order to achieve optimum operation. In order to effect such an operating environment, special temperature controlling devices are required to provide the specific low temperature environments usually 70°–80° Kelvin.

The problem of crystallization or condensation of vapors at these temperatures on surfaces of components in the transmission path of the desired IR signal is serious enough to render the IR detector inoperative. Such condensation occurs when the vapor pressure of the condensate is less than the ambient pressure. Water molecules condense as ice on surfaces at temperatures less than 200° K at ambient pressures of 10 microns ($10\mu$) since the ice vapor pressure is in the order of $10^{-12}$ mm Hg. which is less than the usual ambient pressure $10^{-5}$ mm Hg. at the orbiting altitudes of satellites. Water molecules however will not freeze at these ambient pressures at temperatures 200° K and higher, since the ice pressure vapor is in the order of $10^{-1}$ mm Hg.

Various known systems provide suitable IR detector operating environmental conditions such as radiant coolers. Active refrigeration systems utilize liquid helium and similar coolants. In order to minimize at such low temperatures condensation on surfaces of the detector components along the path of the incoming IR beam, it is essential that condensable vapors such as water vapor be prevented from entering the environment of such components.

Existing devices are not capable of preventing such condensation conditions. The usual devaporization or demoisturization techniques such as isolation chambers are inadequate to prevent the presence of water vapor or other vapor contaminants such as oil, polymers, alcohol in or on the components comprising the detector assembly. No matter how careful the precautions a certain amount of such contaminants particularly water molecules remains. At low pressures in the order of 10 microns or less, moisture that may be entrapped on or below the surface of the components of the assembly system are freed to migrate into the ambient. At low temperatures of 4° to 200° K at which the detector is cooled, such water vapor and molecules that may collect on the detector or the filter windows in the path of the IR beam are frozen thus causing an icing condition which at least degrades the operation of the detector if not rendering it inoperative.

It is a general object of this invention to prevent condensation on the operative portions of IR-detector apparatus.

SUMMARY OF THE INVENTION

According to the invention, an infra-red detector assembly is provided with an outer cylindrical shield portion and an inner coaxial cylindrical portion serving as collector of condensed vapors such as water moisture. Each portion is coaxially telescoped such that a radial space having some clearance is established between the two portions. One end of the outer shield is provided with a window or filter for incoming IR energy, and one end of the inner shield is provided with suitable means for supporting the IR detector in operative relation to the assembly to receive the IR energy through the filter or window. The clearance space is not critical since the dimensions of the assembly are in the whole less than the mean free path of the vapors. The space nevertheless must be less than the mean free path of the vapor. For water molecules at the temperature and pressure of the ambient, for example, for a temperature of 77° K and a pressure of 10 microns the clearance must be less than one meter. In practice, the clearance is in the order 0.060 inch. Accordingly the clearance is not critical since it is much smaller than the critical 1-meter dimension. Water vapor that may be present and will enter into the chamber defined by the shield and collector portions is collected at the annular open inlet portions between the two cylinders in the form of ice effected by freezing the water molecules as they contact the cooled external surface of the inner shield portion. The inner shield is kept relatively colder than the outer shield such that the vapor condenses only on the inner shield.

IN THE DRAWING

FIG. 1 is a longitudinal section of the IR detector assembly, according to one embodiment of the invention; and FIG. 2 is a diagram of an experimental test apparatus arranged to simulate the operating conditions of the detector.

DETAILED DESCRIPTION

Figure 1:
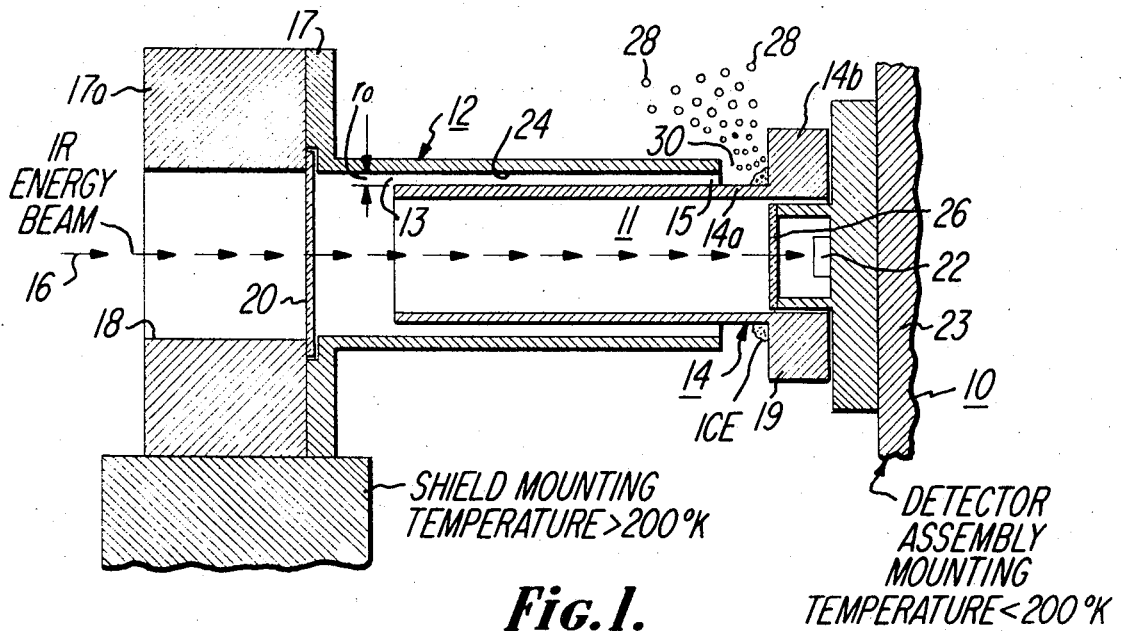

Referring now to FIG. 1 there is shown a detector assembly 10 in longitudinal section comprising an outer cylindrical shield portion 12 and a coaxially inner cylindrical portion 14 serving as the water vapor collector portion. Infra-red (IR) energy is received along the path 16 through the port 18. Within the port 18 defined by the annular flange 17 extending from the outer shield 12 there is clamped in position by ring 17a an IR-filter 20. Window 20 is made of germanium suitably coated with any of the known materials which are opaque to selected unwanted portions of the visible spectrum, thus allowing transmission of certain other selected portions of the incoming IR-spectrum.

An infra-red detector 22 is disposed within the housing 23 integrally formed with inner shield collector portion 14 to receive the IR energy. Detector 22 is a mercury-cadmium-teluride alloy photoconductor semiconductor. Such detectors are well known for optimum operation at 75°–80° K. Other known detectors may be used for other operating conditions as will be apparent to those skilled in the art. A detector window 26 also formed of germanium with any filtering coating is mounted in the path of the IR beam to vacuum-seal the detector 22 in the cavity as shown.

The outer shield portion 12 and the inner collector portion 14 are arranged in coaxial telescopic relation to define an annular clearance space 24 extending longitudinally with the cylinders and having openings 13 and 15 between the respective open ends of the two cylinders. Advantageously the relative positions of the two shields 12 and 14 may be made adjustable for focusing the detector to suit varying conditions. The space of the clearance that is, the radial dimension $r_0$, is less than the mean free path of water molecules at the ambient pressure and temperature. Thus the clearance should not allow for a line-of-sight path from the outer opening 15 to the inner opening 13. The operating pressure of the environment is usually in the order of 10 microns or less for the high altitude operations of satellites. For higher operating pressures (less altitude) the mean free path of the water molecules will be smaller, since the mean free path of molecules is inversely proportioned to the ambient pressure. The assembly comprising the shields 14 and 12 are suitably made of aluminum alloy (e.g. type 1100).

The shields are preferably 2 inches long and one-half inch in diameter with a wall thickness of 0.030 inch. The overlap of the two shields, that is the length of the clearance space 24 is about 1 inch. The shields may be designed to any suitable dimensions as may be dictated by the overall assembly and satellite specifications.

When the detector assembly 10 is fabricated on the ground, the components are dried of all vaporizable contaminants, particularly water. During the launching period of a satellite provided with the detector the ambient pressure is rapidly reduced to $10^{-2}$ mm of mercury or less. At these low pressures vaporizable materials still remaining on the surface and below the surface of the components are vaporized and are purged into the space surrounding the satellite.

Vapor in the chamber 11 of the detector assembly is purged through the clearance space 24. When the satellite reaches its orbit certain amounts of such vapor nevertheless remains near the assembly 10. It is those vapors which present the problem of condensing within the chamber 11.

Water vapor is one of the predominent contaminants. Other material of the type used in this art that can contaminate a sensor are oils such as di-Octyl subacute, polymers, polyesters, and alcohols.

During operation of the detector in the satellite in orbit with the assembly directed to the viewing scene such as the horizon or particular portions of the earth surface, infra-red energy passes to the detector 22 by path 16 through the central portion of the detector assembly 11 through the detector window 26.

The photoconductive material of the detector in response to impinging IR signal energy changes the electrical resistance thereof. Suitable electronic circuitry, not shown, is connected to the detector 22 to process the IR signals.

The outer shield 12 and its mounting structure is kept at a temperature of approximately 200° K while the inner shield 14 and the detector assembly mounting is kept at approximately 95° K by suitable temperature controlling devices not shown but well known in this art. In general, the inner shield is kept at a temperature less than the vapor condensation temperature while the outer shield, insulated from the inner shield by the space therebetween, is at a temperature greater than the vapor condensation temperature. Water vapor comprising water molecules 28 are prevented from reaching the cooled detector window 26 by being intercepted in the area 30 which is generally between the inlet portion 15 of the clearance 24 and the surface portion 14a of the annular flange 19 extending from the shield 14. The surface portions 14a and 14b of the inner shield 14 being metal are at a temperature of 95° Kelvin substantially the temperature of the shield 14. Water molecules 28 which may contact the surface portions 14a and 14b are frozen and retained on those portions in the form of ice. Any water molecules 20 which enter the inlet 15 will not pass to the clearance entirely through the clearance 24 since the mean free path of water molecules at the operating pressure is greater than the dimension $r_0$.

The water molecules 28 move in a straight line-of-sight path and therefore cannot enter the inlet portion 15 in a path parallel to the clearance without first striking the cold surface portion 14a or 14b. Upon striking the cold surface 14a or 14b the water molecules 28 are stopped and frozen and thereby prevented from entering the central chamber portion of the detector assembly 11.

In general, the vapor of the volatile material will either condense or crystallize on the cold surface depending on the ambient conditions.

The outer shield 12 and the inner shield 14 are preferably plated with a low emissivity material such as gold so that the heat leakage from the shield portion 12 to the collector portion 14 is kept to a minimum amount. The anti-condensation detector assembly can be arranged so that the heat-leak from the outer relatively hotter shield 12 to the colder inner shield 14 does not exceed 10 milowatts. It will be understood by those skilled in the art that it is essential to keep the heat leakage to a minimum amount when used with a passive cooler in order to achieve the low detector temperatures required for optimum system performance.

Figure 2:
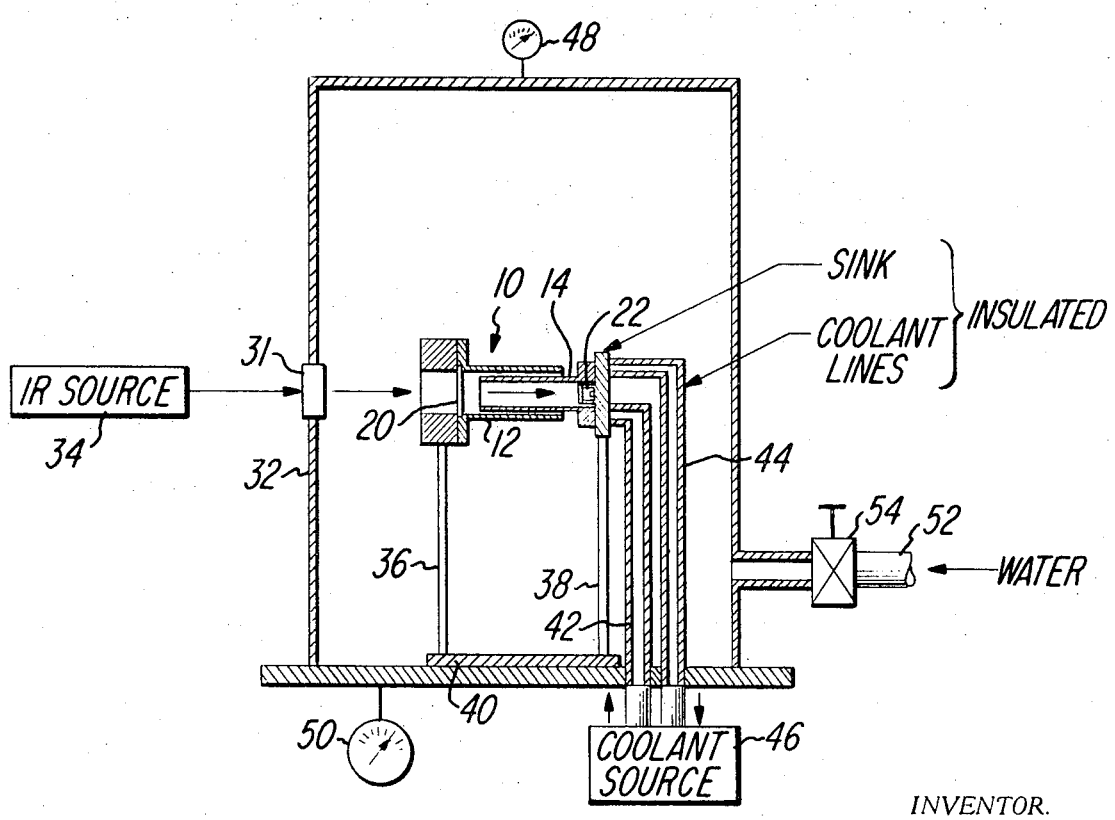

Referring now to FIG. 2, there is shown a schematic of the various apparatus needed to perform tests on the anti-icing device for the infra-red detector according to the invention in an environment simulating the device at satellite altitudes.

It will be appreciated by those skilled in this art that when the invention is utilized in the environment of a satellite orbiting about the earth, gravity effects on the movement of the vaporizable materials including water molecules is negligible. The mean free path of the water molecules in apparatus of the invention for altitudes of 100 miles or higher is in the order of 1 to 2 meters. A simple calculation will show that the deflection of a water molecule owing to the effect of gravity at 1g (9.8 meters/sec.$^2$) is in the order of $3.0 \times 10^{-4}$ inches. This deflection is four orders of magnitude smaller than the usual dimensions of an anti-condensation device made in accordance with the present invention. It is clear, therefore, that the effect of gravity is of no consequence to the operation of the anticondensation device and may be considered negligible.

The detector assembly 10 is mounted in a bell jar 32 formed of stainless steel supported in alignment with an IR source 34 by support brackets 36 and 38 on a base 40. Window 31 is a germanium shield to pass the IR beam into the detector. The input coolant line 42 and exhaust coolant line 44 are arranged for circulation of the coolant around the detector 22.

The lines 42 and 44 are connected to a coolant source 46. The absolute pressure gage 48 and the thermal couple vacuum gage 50 indicate the pressure within the bell jar. The amount of water in the form of vapor is controllably injected into the interior of the bell jar by means of the conduit 52 and needle-valve control 54.

Tests were performed on the anti-condensation device 10 utilizing the simulated environment shown in FIG. 2. Water was injected via line 52 directly into the ambient surrounding the device 10 while temperatures of the device were held at levels simulating orbiting operation to determine if loss of detector signal occurred while the simulated IR-source 34 was developing a ray of IR-energy applied directly to the detector 22. These tests showed that the anti-condensation device did indeed prevent water vapor from entering the chamber 11. Thus, the detector 22 functioned as required for significantly large quantities of water vapor in the ambient surrounding the shields 12 and 14.

Further tests performed on the anti-condensation device 10 for operating conditions wherein moisture was present within the chamber 11 consisted of injecting water via line 52 directly into the anti-icing device until loss of detector signal occurred while the IR source 34 was developing a ray of IR energy applied directly to the detector 22. The detector unit 10 was heated by controlling the coolant temperature to various temperatures for periods of time to determine whether the ice that accumulated on and about the detector would be expelled. The results of the tests indicated that temperatures as low as 180° K (−93° C) could expell the ice provided sufficient time was available to do so. A marked increase in the pressure within the bell jar was shown as the temperature increased to 180° K. The anti-condensation device 10 was not held at this temperature of 180° K for complete purging since the amount of time required to eliminate the presence of moisture and ice would be impractical; the time for purging completely is at least 50 hours. Substantially complete purging of moisture in the system however was achieved at higher temperatures in the order of 220° K in a relatively short period of time.

According to these simulated tests, it has been shown that the anti-condensation device according to this invention can be purged of water by raising the temperature to 200° K and possibly at temperatures as low as 160° to 180° K provided adequate time is allowed for such purging to occur. These simulated tests as will be now appreciated by those skilled in this art are good simulations of operating conditions of space devices in orbit.

It will now be appreciated that in accordance with this invention an anti-condensation device can be provided to prevent condensation and crystallization of volatile contaminants in a detector device of infra-red energy in the presence of volatile vapors such as water vapor, oil, etc. at significantly cold ambient temperatures. According to the principle of the invention, a gap between the dual-temperature shields surrounding the optical path of the infra-red energy functions as a trap of water molecules that would otherwise move into the path of the radiation and ice on components in said path.

What is claimed is:

1. An apparatus having an enclosure,
   a radiation sensor in said enclosure,
   a passageway through the walls of said enclosure for the passage of contaminant vapors, the spacing of said passageway being less than the mean free path of said vapors,
   means by which the surfaces adjacent said passageway are cooled at a temperature below the condensation and crystallization temperature of said vapors so that vapors are crystallized or condensed on said surface and are prevented thereby from entering said passageway.

2. An apparatus for detecting radiation from an object in the presence of volatile material in a cold ambient comprising:
   a. a radiation detector disposed in the path of radiation;
   b. a generally elongated cylindrical shield surrounding the radiation path adjacent the detector;
   c. a window transparent to the radiation closing off said shield;
   d. an annular clearance in said shield;
   e. said clearance having a dimension less than the mean free path of molecules of the vapor of said volatile material at the ambient conditions;
   f. said shield being adapted to be temperature controlled so that the temperature adjacent said annular clearance is less than the crystallization and condensation temperature of said volatile material, and the temperature remote from said annular clearance is greater than the crystallization and condensation temperature of said volatile material.

3. An apparatus according to claim 2 wherein said detector is an infra-red detector.

4. An apparatus according to claim 3 wherein said shield is formed of a pair of coaxial cylinders, one extending over the other and spaced to define said annular clearance.

5. An apparatus according to claim 3 wherein said shield is coated with gold.

6. An apparatus according to claim 1 wherein said contaminant vapors comprise the class including water, oil, polymers, alcohol and esters.

7. An apparatus according to claim 4 wherein said annular clearance is less than one meter, the temperature of the ambient being in the range of 4° to 200° K, and the pressure being in the range of $10^{-2}$ to $10^{-12}$ mm of Hg.

8. An apparatus according to claim 4 further including means for controlling the relative temperatures of said coaxial cylinders including cooling means connected to the innermost cylinder.

9. An apparatus according to claim 4 wherein said cylinders are adapted for longitudinal movement for selectable adjustment of the relative overlap of said cylinders to focus said detector.

* * * * *